Sept. 8, 1931.  D. J. STEWART ET AL  1,822,679
INDUCTION MOTOR
Filed March 19, 1931     2 Sheets-Sheet 1

INVENTOR
Duncan J. Stewart
and
BY Edgar D. Lilja
Chindahl, Parker & Carlson
ATTORNEYS Sept. 8, 1931.  D. J. STEWART ET AL  1,822,679
INDUCTION MOTOR
Filed March 19, 1931   2 Sheets-Sheet 2
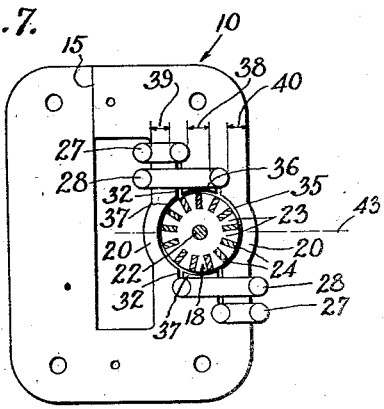
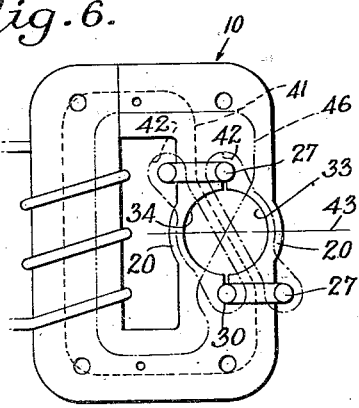
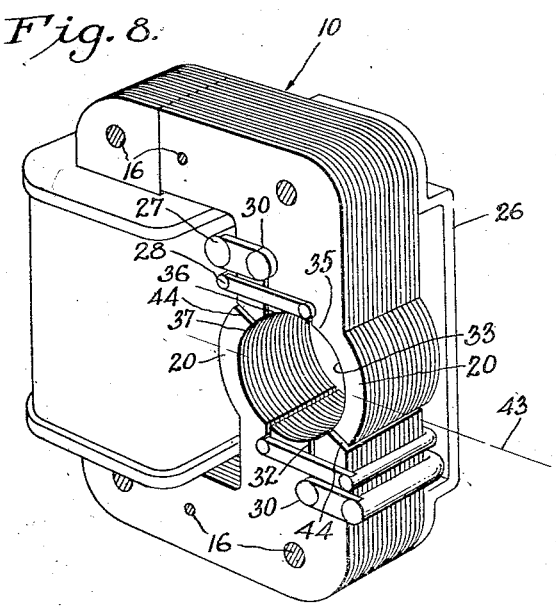
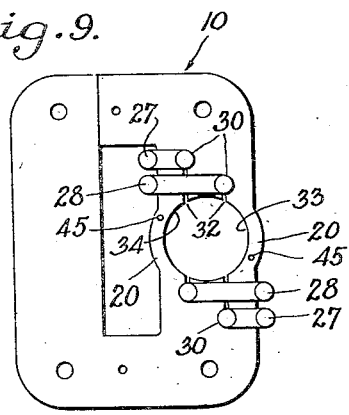
INVENTOR
Duncan J. Stewart
and
BY Edgar D. Lilja
ATTORNEYS Patented Sept. 8, 1931

1,822,679

UNITED STATES PATENT OFFICE

DUNCAN J. STEWART AND EDGAR D. LILJA, OF ROCKFORD, ILLINOIS, ASSIGNORS TO HOWARD D. COLMAN, OF ROCKFORD, ILLINOIS

INDUCTION MOTOR

Application filed March 19, 1931. Serial No. 523,720.

This invention relates to fractional horse power induction motors in which shifting of the magnetic field is produced by the action of shading coils, and more particularly the invention relates to a shading ring motor having a two pole stator of the so-called core type, that is, with the energizing winding enclosing the entire section of the magnetic circuit through the poles.

The primary object of the invention is to improve the operating characteristics of motors of the above class and thus produce a motor which is capable of developing substantially greater torque and power and has a much higher efficiency than prior motors of corresponding size.

More specifically stated, the invention aims to provide a novel stator constructed to produce a highly effective magnetic field by reason of the intensities and phase displacement of its shaded and unshaded field components and the manner of their distribution around a squirrel cage rotor, the structure of which is coordinated with and adapted to that of the stator so that the full effect of the rotating field may be utilized in producing motor action.

A further object is to provide a motor of the above class having on each of its poles a plurality of shading rings of different sizes arranged in a novel and advantageous manner.

Still another object is to provide a shading ring of a new and improved construction.

Other objects and advantages of the invention will become apparent from the following detailed description taken in connection with the accompanying drawings, in which:

Fig. 6 is an actual size side elevational view of the stator including a diagrammatic representation of magnetic circuits threaded by the various components of the magnetic field.

Fig. 7 is a view similar to Fig. 6 showing a different arrangement of shading rings and the rotor in cross-section.

Fig. 8 is a view similar to Fig. 1 showing a modified form of the motor.

Fig. 9 is a view similar to Fig. 6 showing another modification of the stator construction.

Figure 1:
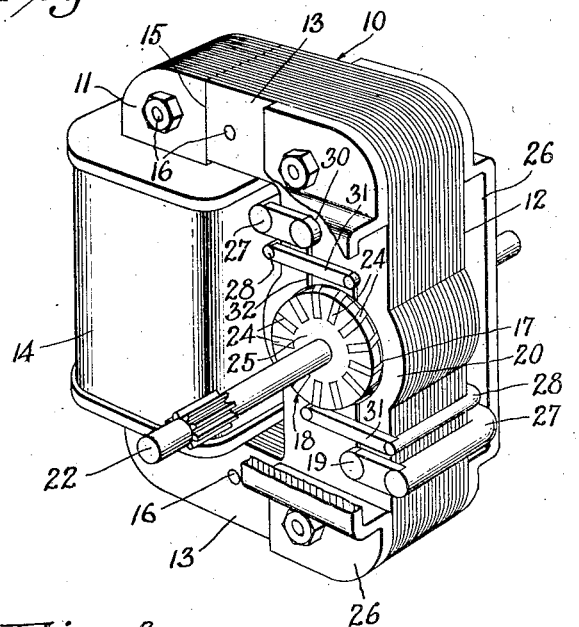
Figure 1 is a perspective view of a motor embodying the features of the present invention and shown on an enlarged scale.
Figure 2:
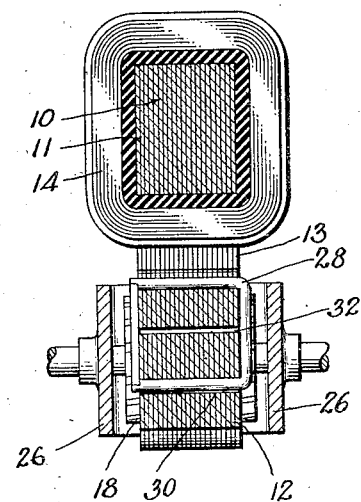
Fig. 2 is an enlarged sectional view taken along a plane including the line 2—2 of Fig. 1.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

The core type stator or field member of the motor shown in the drawings by way of illustration is composed of a stack of laminations 10 stamped from sheets of magnetic iron and having overall dimensions of 2 inches wide and 2⅝ inches long for a motor of the preferred size shown in Fig. 6. Each lamination is generally rectangular in form having two elongated side portions or legs 11 and 12 of substantially equal width (¾ inch) and relatively shorter end portions 13 of substantially the same width as the side portions. Preferably the number and thickness of the laminations is such that their side portions 11 form a core of substantially square cross section or having a thickness of $\tfrac{13}{16}$ inches. This core is surrounded by a coil 14 of wire wound on an insulating spool.

Figure 3:
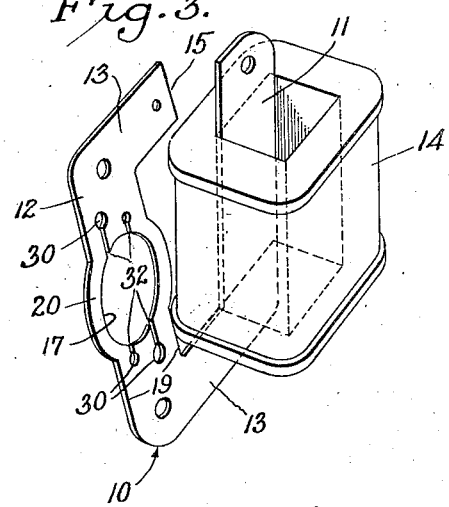
Fig. 3 is an enlarged perspective view illustrating the manner of assembling the stator laminations and winding.

To facilitate assembly of the core within the spool, each lamination is cut along a single line 15 which intersects and constitutes an extension of the inner edge of the side portion 11. This enables the adjacent portions of the lamination to be flexed laterally as shown in Fig. 3, after which the side portion 11 may be pushed through the spool. By slitting the adjacent laminations at opposite ends, lapped joints are formed at opposite ends of the coil leg rendering the field member extremely rigid and the magnetic circuit therethrough highly permeable. The laminations are secured together by bolts or rivets 16, two of which are located on oppsite sides of the joint and adjacent thereto in order to avoid unnecessary vibration of the terminal laminations.

At the middle of their side legs 12, the stator laminations are apertured to provide a circular opening 17 for receiving a cylindrical rotor 18. The longitudinally alined portions of the stator leg 12 on opposite sides of the opening 17 constitute two magnetic poles with straight parallel side surfaces 19 and opposed concave end faces. For purposes which will later appear, the side portions or tips of the poles are extended toward each other around the rotor to form a magnetic path between the tips of the opposite poles. In the motor shown in Fig. 1, the pole extensions are formed integral with each other so that the tips of the poles proper are joined by segments 20 of solid laminated iron. In the rotor illustrated in Fig. 8, the laminations forming the extensions are integral at one end only with the laminations of the pole proper. In both forms, the inner surfaces of the extensions constitute concontinuations of the pole faces proper, so that the rotor surface is enclosed by a substantially uninterrupted iron surface having a width measured axially of the rotor equal to the thickness of the stator. The structural characteristics and functions of these pole extensions will be more fully described later.

Figure 5:
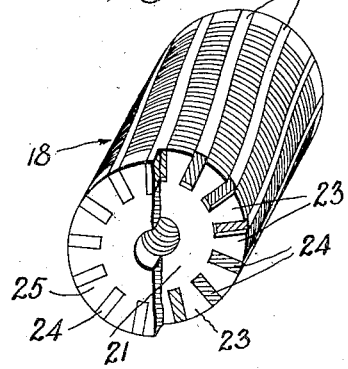
Fig. 5 is an enlarged perspective view of the rotor partially broken away.
Figure 4:
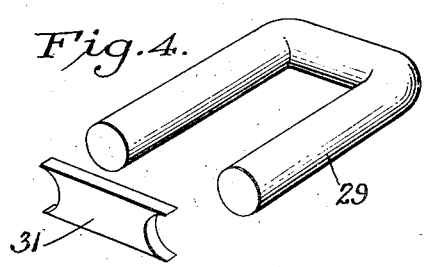
Fig. 4 is an enlarged perspective view showing the parts of one of the shading rings.

The construction of the rotor 18 has an important bearing upon the torque and power output of the present motor. It is of the squirrel cage type with its inductor bars constructed and arranged to provide an effective iron section which is relatively large considering the small size of the rotor and which may be worked at a high flux density around the entire rotor circumference. In practice the rotor is made about three-quarters of an inch in diameter which is approximately the width of the coil leg 11 and the rotor leg 12 of the stator. As shown in Fig. 5, the rotor comprises an iron core of a length equal to the thickness of the stator composed of laminations in the form of disks 21 perforated at their center to receive a one-eighth inch steel shaft 22. Around its periphery, each disk is formed with teeth 23 defining between them notches which cooperate with the notches of the other disks to form a plurality of parallel grooves in which are disposed inductor bars 24 electrically connected at their opposite ends by copper disks 25 which may be of the same shape as the iron disks. The disks 25 and the bars 24 are held together by solder.

For the development of maximum starting torque with a given size rotor, the bars 24 are made of such cross-sectional shape that the dimension of each, measured radially of the rotor, is substantially greater than its circumferential thickness. In the present instance, the bars are of rectangular cross-section, their radial width and circumferential thickness being about ⅛ and 0.04 inches respectively, giving an area of 0.005 square inches which is approximately that of standard No. 12 wire of circular cross-section.

The most advantageous size of the inductor bars will vary with the number of bars employed, the size of the rotor, and the motor characteristics to be obtained. For rotors of the size shown in the drawings the combined cross-sectional area of the bars should be approximately $\frac{1}{16}$ square inches, so that approximately one-sixth of the cross-sectional area of the rotor is comprised of copper.

In order to minimize radial vibration of the rotor and the noise incident thereto, the shaft 22 is supported in two rugged bearings disposed in axial alinement immediately adjacent opposite ends of the rotor. The bearings are formed at the center of two bracket plates 26 of non-magnetic material whose opposite ends are bent so as to lie flat against the sides of the stator at opposite ends of the stator legs 12 to which the plates are securely bolted.

The width of the gap around the rotor is determined by numerous factors including the rotor reactance, the tendency of the rotor to vibrate, and manufacturing difficulties in obtaining a gap of narrow and uniform width. In the present instance, the radial width of the gap between the rotor surface and the pole faces is 0.011 of an inch.

The rotating magnetic field for producing rotational movement of the rotor is produced by the well-known shading ring method. That is to say, one side portion of each pole is enclosed by a short-circuited conductor in which currents are induced by the transformer action of the main field flux threading the ring when the coil 14 is energized by alternating current. The effect of the currents induced in the rings is to oppose the change in the flux in the enclosed portion of each pole, with the result that the flux in the unshaded pole area rises to its maximum value before the flux in the shaded area. Owing to this so-called time lag or phase displacement, the magnetic field is said to shift across the pole faces producing motor action on the rotor as is well understood in the art.

In the drawings two shading ring arrangements are disclosed, there being one ring 27 per pole in the motor shown in Fig. 6 and a similar ring and also an additional ring 28 on each pole in the motor shown in Figs. 1 and 7. In order to reduce manufacturing costs and the size of the motor as a whole, each shading ring herein shown comprises a length of copper wire 29 bent to a U-shape, thereby defining two straight parallel legs or side portions, one of which is inserted through a hole 30 formed in the stator laminations adjacent the rotor recess 17.

The legs of the U-shaped wire are of a length greater than the thickness of the stator so that their ends project beyond the terminal stator lamination. These ends are connected by a copper bar 31 preferably of flat metal stock so as to lie flat against the stator surface. At opposite ends, the bar 31 is formed with concave surfaces which fit around and conform closely to the convex surface of the wire 29. Thus a large contact area is provided between the separable parts of the ring which are suitably secured together by the application of solder at their joints.

During the soldering operation, the concave ends of the bar 31 may be held conveniently in abutting relation with respect to the sides of the legs of the wire 29 by inserting the bar between the projecting ends of the wire and forcing these toward each other. With the parts thus held in clamping engagement, solder is applied to the joints and adjacent surfaces of the bar and member 29.

Preferably slots 32 are cut in the stator laminations so as to provide a non-magnetic gap between the unshaded and shaded pole sections, and between the single and double shaded sections in the form of the invention shown in Fig. 1. Thus the face of each pole of the motor shown in Fig. 6 is divided into an unshaded area 33 and a shaded area 34. In the motor shown in Figs. 1 and 7 having two shading rings on each pole, the slots 32 form an unshaded area 35, an adjacent single shaded area 36, and a double shaded area 37 on the side of the pole opposite the unshaded area. The effect of such a gap is to increase the reluctance of the local magnetic circuit defined by the stator iron around and immediately adjacent the enclosed leg of the shading ring. To avoid decreasing the pole face area appreciably, the gap should be made very narrow, at least at and adjacent the rotor recess.

Where there is only one shading ring on each pole, as in the form of the invention shown in Fig. 6, the ring should be located closely adjacent the rotor recess and preferably enclose not more than one-half of the total pole sectional area.

The torque of the motor may be materially improved through the use of a plurality of shading rings of different sizes on each pole and enclosing different proportions of the total pole section. Thus the ring 27 preferably encloses one-third of the total pole section. The larger ring 28 encloses this same section of the pole and also an additional section 38 preferably approximately equal in cross-sectional area to and at least not materially greater than the section 39 enclosed by the smaller ring. With the arrangement shown, the unshaded section 40, the section 38 shaded only by the ring 27, and the section 39 enclosed by both rings are of approximately equal areas. These sections are separated by the gaps 32, thus dividing the pole face into the unshaded, single shaded and double shaded areas 35, 36 and 37 respectively. The correspondingly shaded areas are disposed on diametrically opposite sides of the rotor.

When a plurality of shading rings are employed on each pole, they are preferably mounted on the stator so that their corresponding sides will be disposed in closely spaced but different planes. Such arrangement enables all of the legs of the rings to lie flat against the pole surfaces and the length and therefore the resistances of the rings to be reduced to a minimum. Material of smaller cross-sectional area may therefore be used in providing for the desired low resistance of the rings. Furthermore, the rings thus arranged do not project an appreciable distance beyond the outermost points of the stator leg 12 so that the overall width of the stator and the length of the magnetic circuit therethrough are minimized. In addition the stator effectually holds the rings against lateral displacement thereby maintaining them in properly insulated relation even though they are spaced close together. The maintenance of such relation is important because electrical contact between the rings would establish auxiliary circuits in which currents would be induced tending to neutralize the shading effect of the rings, particularly the smaller one. Arranging the corresponding portions of the rings in different planes also facilitates the application of solder without danger of connecting the rings electrically by the solder.

In order that the magnetic field threading the shading ring will have maximum effectiveness in producing motor action, it is desirable that the magnitude of this field be as large as possible, and at the same time have as much lag as possible, that is, be displaced in time phase as far as possible from the field threading the unshaded section of the pole. As shown diagrammatically in Fig. 6, the field threading the shaded pole areas may be considered as the resultant of a main field component, the mean path of which is represented by the line 41, and a lagging component due to the current induced in the ring. The latter component is affected by the reluctance of magnetic circuits the mean paths of which are indicated by the lines 42 (Fig. 6).

It will be apparent that an increase in the shading ring resistance will reduce the amount of current induced in the ring thereby decreasing the phase displacement of the resultant flux through the shaded pole section. At the same time, such an increase in ring resistance decreases the opposition of the shading ring and therefore increases the value of the component 41. Thus, with an increase in ring resistance, the shaded field is less effective from the standpoint of phase displacement, but it is of greater magnitude due to the higher value of the component 41. Conversely, a decrease in ring resistance will increase the lag of the shaded field but will decrease its magnitude.

For best results a compromise is established between these two opposing factors and a shading ring resistance is employed which results in the production of optimum power and torque. In motors of the size shown in Fig. 6 and having one shading ring on each pole, the ring resistance should be approximately between 1 and 2 x $10^{-4}$ ohms. Rings formed from Nos. 8, 9, 10 or 11 standard copper wire of circular cross-section would have resistances within this range and the currents induced in such rings in the motor herein disclosed would be within a range of from approximately 100 to 200 amperes.

Where two shading rings are provided on each pole, the resistance of the smaller should be within the range above specified but a wider variation is allowable in the resistance of the larger ring. The latter may be made of any size wire from No. 8 to No. 14.

For motors of sizes different from that shown in Figs. 6, 7 and 9, the cross-sectional area of the shading ring wire required to give best magnetic performance should be larger in the case of a smaller motor and smaller for larger motors in order to maintain the shading ring current approximately constant. This requirement imposes a fixed limitation upon the size of motor which can be constructed. This is because the shading ring losses increase with the size of the motor at a more rapid rate than the surface areas for dissipating the heat due to such losses.

From the foregoing considerations, it will be apparent that the most effective shaded field which can be produced in a motor of the present type is inherently weaker than the unshaded field and therefore requires a smaller proportion of the rotor iron for its efficient utilization. The present invention contemplates increasing the output of the motor by providing for efficient distribution of the unshaded flux so that those parts of the rotor iron not required for carrying the shaded flux will be worked at relatively high density by unshaded flux.

The utilization of a larger unshaded field in the rotor iron is accomplished in the present instance by enlarging the unshaded areas 33 (Fig. 6) and 35 (Fig. 7) by means of magnetic extensions of the unshaded tips of the poles proper. These extensions closely follow the rotor contour so that the unshaded flux may enter the rotor iron along the entire length of the extension to a point beyond the midline 43. Thus, the rotor iron exposed to these extensions is utilized at high density when the unshaded pole extensions are substantially saturated.

In the present instance, the segments 20 form magnetic paths of low reluctance for effecting proper distribution of the unshaded flux. As previously described, they are composed of segmental laminations preferably integral at one end with the unshaded side tip of the poles proper so as to present a continuous iron surface on their inner sides. In all forms of the motor shown in the drawings, the extensions project around the rotor surface toward the opposite pole to a point at least closely adjacent the center line 43 so that a substantial amount of unshaded flux enters the rotor iron beyond such line.

Preferably the magnetic extensions project uninterruptedly beyond the line 43 thereby effecting a still greater enlargement of the unshaded pole area from which the unshaded flux may enter the rotor iron. As shown in Figs. 1 to 7, the uninterrupted extension may completely close the space between the two poles and be formed integral with the shaded tip of the opposite pole. Or, where the stator laminations are made in two parts brought together at butt joints, one of the joints in the field member may be adjacent the line 43 or preferably between this line and the shaded pole tip.

While provision of an integral connection between the shaded tip of one pole and the projected end of the unshaded pole extension is conducive to the leakage of some flux around the rotor which might otherwise thread the same, it simplifies manufacture and enables the rotor recess to be accurately defined and the rotor air gap to be reduced to a minimum width and maintained uniform around the entire rotor circumference. If desired, the flux leakage above mentioned may be reduced by introducing a reluctance such as a narrow air gap 44 (see Fig. 8) in the segment 20 between the line 43 and the shaded tip, preferably nearer the latter. For best results this gap should be very narrow, e. g. approximately 0.013 inches but may be increased to 0.030 inches without seriously reducing the power. Such a reluctance or other equivalent restriction does not interfere with the distribution of the unshaded flux to the rotor iron at points beyond the center line 43. By making the reluctance in the form of a hole 45 (Fig. 9), the rigidity of the stator structure defining the rotor recess may be preserved and the flux leakage at the same time reduced. The hole should be located between the line 43 and the shaded pole tip.

In addition to the function of causing shifting of the magnetic field, the shading rings when made of relatively low resistance perform the function of opposing leakage of the unshaded flux from the unshaded tip extensions directly to the shaded tip of the opposite pole thereby causing substantially all of the available unshaded flux threading the pole extension to be diverted through the rotor and so utilized in the production of motor action. Such action of the shading rings is due to the magneto-motive force produced by the currents in the rings and in order that ring currents induced and therefore the magneto-motive force set up may be sufficiently high, it is necessary that the resistance of the shading rings be relatively low. For this purpose, rings having a resistance approximately of the range above specified for obtaining most effective shading action will create the desired force opposing leakage of the unshaded flux, due regard being given to the size of the motor and the proportion of the pole section enclosed by the ring.

It is also to be observed in this connection that when two shading rings are employed on each pole and arranged as shown in Figs. 1 and 6 for the purpose of producing a uniformly progressive shifting of the field across the pole faces, the longer rings 28 enclose the side portions of the holes through which the unshaded flux tends to leak as above set forth. The currents induced in these longer rings augment the magneto-motive force produced by the small rings and therefore perform the additional function of causing more effective opposition to the undesirable flux leakage.

The radial width of the unshaded pole extensions at the center line 43 or at the narrowest point along their length may vary somewhat without appreciably impairing the motor output. Segments $\frac{3}{32}$ inches wide or approximately one-seventh of the width of the poles have proven most effective in producing proper distribution of the unshaded flux while maintaining high efficiency of the motor.

The shape of the outer surfaces of the segments 20 is not of material importance so long as the inner surfaces closely follow the contour of the rotor, that is, are spaced therefrom approximately the same distance as the faces of the poles proper. Herein, the segments are formed with convex outer surfaces which enables the overall width of the motor to be reduced without decreasing the power output. Thus, the poles are made of substantially the same width as the winding core 11 with the segments 20 bulging outwardly beyond the sides 19 of the poles so as to occupy the same spaces laterally of the poles as are occupied by the shading rings. A double reduction in the width of the motor is thus effected with such construction which also permits smaller size wire to be used for the shading rings.

It will be apparent from the foregoing that extension of the unshaded pole areas around the rotor is advantageous in the present motor because the rotor employed is of small diameter and a substantial proportion of its periphery is obstructed by the relatively large number of non-magnetic inductor bars. With such extensions, larger segments of the rotor surface and therefore larger areas of effective iron are enclosed and thereby made available for entry of the predominating unshaded field and no parts of the rotor iron are unduly saturated. In the case of the motor having two shading rings on each pole, the magnetic extensions compensate for the decrease in the pole sections 40 resulting from the addition of the larger ring. Thus, it will be seen from Fig. 7 that the effective iron area of the rotor teeth 23 enclosed by each unshaded area 35 and its extension up to the center line 43 is approximately equal to and therefore is capable of carrying substantially all of the flux capable of being delivered by the unshaded section 40 of the pole. In the case of motors having only one shading ring on each pole, the unshaded areas 33 of the poles proper enclose a larger number of the rotor teeth than in the case of the motor shown in Fig. 7; nevertheless the unshaded pole extensions are required in order that the rotor iron may utilize the larger amount of flux threading the unshaded section which, it will be observed, is of substantially greater cross-sectional area than in the case of the motor having two rings on each pole.

Inasmuch as the segments 20 cause a substantial amount of unshaded flux to enter the rotor near or beyond the center line 43, the effect is to shift the mean line 46 of the unshaded field nearer to the line 43 and thereby increase the space displacement of the unshaded field relative to the shaded field. In this way, the space relation of the shaded and unshaded components of the rotating magnetic field more nearly corresponds to the time phase relation which, it will be remembered, is established at the most effective value in the present motor by using shading rings of the proper resistance.

While it is preferred, for the reasons above mentioned, that the segments 20 be of substantially solid iron at least from the unshaded pole tips to points adjacent the shaded tips of the opposite poles, a non-magnetic interruption or other reluctance is permissible provided that such interruption is not of such a character as to cause a material decrease in the capacity of the pole extension to maintain the proper unshaded flux density at points adjacent or beyond the midline 43 where such flux can be utilized efficiently.

Such a decrease would occur for example where an air gap of substantial width such as has been commonly employed heretofore in motors of the present type is located midway between the pole tips.

On the other hand, if the interruption is in the form of a butt joint or is in the form of an extremely small gap on the order of a few thousandths of an inch, the decrease of the flux is in such case so small as not to affect the output of the motor materially. With the gap of a width not exceeding that between the rotor and pole faces and located along the line 43, the power of the motor is not materially reduced. A marked reduction results if the width of the gap located adjacent the line 43 is increased to $\frac{1}{32}$ of an inch. The detrimental effect of a high reluctance section in the segments 20 is more noticeable when such section is offset from the line 43 in the direction of the unshaded pole; in fact any high reluctance section in this part of the segment is detrimental from the standpoint of power and torque because such a section reduces the effectiveness of the rotor iron adjacent and beyond the line 43 in utilizing the available unshaded flux.

Another function of the magnetic extensions of the unshaded pole tips is to decrease the reluctance of the magnetic circuits 42. It will be observed from Fig. 6, that substantially the entire length of the segments 20 are included in the circuits 42 so that if the segments 20 were interrupted between the line 43 and the unshaded pole tips by appreciable air gaps or other reluctance sections, the value of the magnetic field due to the induced shading ring currents would be reduced accordingly.

In order that extensions of the unshaded pole tips may function in the manner above described, the coil 14 is constructed to have sufficient magneto-motive force to substantially saturate the available rotor iron and the winding core 11, and other parts of the stator are of sufficient size to carry the flux thus required.

In the appended claims the expression "magnetic extensions for causing effective distribution of unshaded flux to the rotor iron over an enlarged range extending beyond the midpoint between the poles" contemplates and includes the following equivalent structures; solid laminated extensions such as the segments 20 continuous or interrupted near the shaded pole substantially as shown, or the segments 20 having between the unshaded pole tips and the median plane between the poles an air gap or other equivalent restriction producing a magnetic effect less than a radial air gap $\frac{1}{32}$ of an inch wide located at said median plane.

This application forms a continuation in part of our former application Serial No. 407,819, filed November 18, 1929.

We claim as our invention:

1. In an induction motor, the combination of a field member having a plurality of poles, a rotor exposed to the faces of said poles, and a plurality of shading rings of different sizes mounted on each of said poles adjacent said rotor with all of the rings on each pole enclosing a common pole section and the larger rings enclosing additional sections, the corresponding portions of the rings on each pole being disposed in different closely spaced transverse planes through the pole.

2. A small induction motor having a core type stator providing two opposed poles, a cylindrical rotor having an iron core and inductor bars spaced around the core periphery, two relatively small shading rings enclosing side portions of said poles on diametrically opposite sides of said rotor, and two larger shading rings one on each pole enclosing the same section as the smaller ring and also an additional section approximately equal in area to but not materially greater than the section enclosed by said smaller ring.

3. An alternating current induction motor combining a stator of the core type providing two poles having opposed concave faces, a rotor of the squirrel cage type between said poles, shading coils enclosing side portions of said poles on diametrically opposite sides of said rotor and dividing said faces into a section from which unshaded flux enters the rotor and a shaded section from which a lagging flux enters the rotor, and magnetic connections between said poles having their opposite ends integral with the shaded and unshaded side tips of the opposite poles and providing inner iron surfaces closely following the rotor contour and enclosing all of the rotor iron between the poles, said rings being of such low resistance that the currents induced therein produce a magneto-motive force strongly opposing the leakage of flux directly between said poles whereby to cause substantially all of the unshaded flux threading said connections to be utilized in the rotor.

4. An alternating current induction motor comprising a stator of the core type composed of a stack of iron laminations and providing two poles having opposed concave faces, a cylindrical squirrel cage rotor disposed between said poles, shortcircuited shading coils enclosing side portions of said poles on diametrically opposite sides of said rotor and dividing said forces into a section from which unshaded magnetic flux enters the rotor iron and a section threaded by a lagging flux, and means enlarging the range of distribution of said unshaded flux to the rotor iron comprising an extension of each unshaded pole tip following closely the rotor surface and adapted to distribute a substantial amount of unshaded flux to the rotor iron beyond the median plane between the poles, each of said shading coils being of low resistance so that the current induced therein produces a magneto-motive force of sufficient magnitude to oppose any substantial leakage of unshaded flux directly through the extensions to the shaded pole tips whereby to divert substantially all of the unshaded flux threading said extensions into the rotor.

5. An alternating current induction motor combining a laminated stator of the core type providing two poles having opposed concave faces, a cylindrical rotor of the squirrel-cage type disposed between said poles, short-circuited shading coils of low resistance enclosing side portions of said poles on diametrically opposite sides of said rotor so as to divide each of said faces into a section from which unshaded magnetic flux enters the rotor iron and a section threaded by a lagging flux, and means enlarging the range of distribution of said unshaded flux to the rotor iron comprising magnetic extensions of each unshaded pole section following closely the contour of the rotor, said rings of low resistance and said magnetic extensions cooperating to cause effective distribution of unshaded flux to the rotor beyond the median plane between the poles.

6. An alternating current induction motor combining a stator of the core type providing two poles having opposed concave faces, a cylindrical rotor of the squirrel-cage type disposed between said poles, short-circuited shading coils of low resistance enclosing side portions of said poles on diametrically opposite sides of said rotor and dividing each of said faces into a section from which unshaded magnetic flux threads the rotor iron and a section threaded by a lagging flux, and means cooperating with said coils of low resistance to cause effective distribution of unshaded flux to the rotor iron between said unshaded face sections of the poles and points beyond the median plane between the poles comprising a solid laminated extension of each unshaded pole tip projecting around the rotor toward the shaded tip of the opposite pole and having an inner iron surface closely following the rotor contour, each extension between the said median plane and the unshaded pole tip having no restriction therein greater in magnetic effect than a radial air gap $\frac{1}{32}$ of an inch wide located at said median plane.

7. An alternating current induction motor combining a stator of the core type providing two poles having opposed concave faces, a rotor of the squirrel cage type between said poles, shading coils enclosing side portions of said poles on diametrically opposite sides of said rotor and dividing said faces into a section from which unshaded flux enters the rotor and a shaded section from which a lagging flux enters the rotor, and extensions of the unshaded tips of said poles closely following the rotor contour and constructed to distribute a substantial amount of unshaded flux to the rotor iron beyond the median plane between the poles, said stator having an overall dimension of approximately 2 inches wide and 2⅝ inches long with legs approximately ¾ inches wide and $\frac{9}{16}$ inches thick, and said coils having a resistance of approximately 1 to 2 x $10^{-4}$ ohms.

8. An alternating current induction motor combining a stator of the core type providing two poles having opposed concave faces, a rotor of the squirrel cage type between said poles, shading coils enclosing side portions of said poles on diametrically opposite sides of said rotor and dividing said faces into a section from which unshaded flux enters the rotor and a shaded section from which a lagging flux enters the rotor, and extensions of the unshaded tips of said poles closely following the rotor contour and constructed to distribute a substantial amount of unshaded flux to the rotor iron beyond the median plane between the poles, each of said coils having a resistance such that the current induced therein is within a range of from approximately 100 to 200 amperes.

9. An alternating current induction motor combining a stator of the core type providing two poles having opposed concave faces, a cylindrical rotor of the squirrel-cage type disposed between said poles, short-circuited shading coils enclosing side portions of said poles on diametrically opposite sides of said rotor and dividing each of said faces into a section from which unshaded magnetic flux threads the rotor iron and a section threaded by a lagging flux, an extension of each unshaded pole tip closely following the rotor contour and projecting to a point adjacent the shaded tip of the opposite pole, the currents induced in said rings producing a magneto-motive force tending to oppose the leakage of unshaded flux around said rotor whereby to divert such flux into the rotor, and a second shading ring on each pole enclosing the same section as said first ring and also an additional section and serving to produce a progressive shifting of the magnetic field across each pole face and also to create additional opposition to the leakage of unshaded flux from said extensions to the shaded pole tips.

10. An alternating current induction motor combining a stator of the core type providing two poles having opposed concave faces, an energizing winding on the stator, a cylindrical rotor of the squirrel-cage type disposed between said poles, short-circuited shading coils enclosing side portions of said poles on diametrically opposite sides of said rotor and dividing each of said faces into a section from which unshaded magnetic flux threads the rotor iron and a section threaded by a lagging flux, each of said unshaded pole sections having an extension in the direction of the opposite pole following closely the contour of the rotor and proportioned so as to cause effective distribution of unshaded flux to the rotor beyond the median plane, said stator and winding being constructed so as to be capable of maintaining the pole faces and the faces of said extensions substantially saturated.

11. An alternating current induction motor comprising a stator of the core type composed of a stack of iron laminations and providing two poles having opposed concave faces, an energizing winding on the stator, a cylindrical squirrel cage rotor disposed between said poles, short-circuited shading coils enclosing side portions of said poles on diametrically opposite sides of said rotor and dividing said faces into a section from which unshaded magnetic flux enters the rotor iron and a section threaded by a lagging flux, and means enlarging the range of distribution of said unshaded flux to the rotor iron comprising extensions formed integral with the stator laminations and projecting from each unshaded pole tip in closely spaced relation to the rotor and connected with the opposite shaded pole tip, said stator and winding being so constructed as to be capable of maintaining the pole faces and the faces of said extensions substantially saturated.

12. An alternating current motor combining a cylindrical rotor of the squirrel cage type having a plurality of copper inductor bars of a combined cross-sectional area equal approximately to one-sixth of the total cross-sectional area of the rotor, a stator of the core type having two opposed poles embracing said rotor, shading rings of low resistance enclosing side portions of said poles on diametrically opposite sides of said rotor and dividing each pole into shaded and unshaded sections, and magnetic extensions of the unshaded pole sections closely following the rotor contour and adapted to distribute a substantial amount of unshaded flux to the rotor iron beyond the median plane between the poles.

In testimony whereof we have hereunto affixed our signatures.

DUNCAN J. STEWART.
EDGAR D. LILJA.